(12) United States Patent
Selvam et al.

(10) Patent No.: US 8,743,727 B2
(45) Date of Patent: Jun. 3, 2014

(54) DRIVING HYBRID LOCATION SERVICES FROM WLAN STATIONS USING ACCESS POINTS

(75) Inventors: Sivakumar Panneer Selvam, Tamil Nadu (IN); Vijay Kumar Dewangan, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 13/474,284

(22) Filed: May 17, 2012

(65) Prior Publication Data

US 2013/0308618 A1  Nov. 21, 2013

(51) Int. Cl.
*H04W 24/00* (2009.01)
(52) U.S. Cl.
USPC ............. 370/252; 455/456.5; 455/456.6
(58) Field of Classification Search
USPC ............. 370/252, 328, 329, 338; 455/456.1, 455/456.5, 456.6
See application file for complete search history.

(56) References Cited

U.S. PATENT DOCUMENTS

| 7,937,514 | B2 | 5/2011 | Aytur et al. |
| 8,068,467 | B2 | 11/2011 | Pandey et al. |
| 2007/0121560 | A1 | 5/2007 | Edge |
| 2007/0248058 | A1 | 10/2007 | Fajardo et al. |
| 2008/0096572 | A1* | 4/2008 | Hsu et al. ............... 455/450 |
| 2009/0085806 | A1 | 4/2009 | Piersol et al. |
| 2010/0130229 | A1 | 5/2010 | Sridhara et al. |
| 2010/0278060 | A1 | 11/2010 | Lee et al. |
| 2011/0110338 | A1 | 5/2011 | Khoryaev et al. |
| 2011/0269478 | A1 | 11/2011 | Das et al. |
| 2012/0294231 | A1* | 11/2012 | Finlow-Bates et al. ....... 370/328 |

OTHER PUBLICATIONS

International Search Report and Written Opinion—PCT/US2013/040339—ISA/EPO—Aug. 13, 2013.

* cited by examiner

*Primary Examiner* — Kerri Rose
(74) *Attorney, Agent, or Firm* — Mahamedi Paradice Kreisman LLP (57) ABSTRACT

A wireless local area network (WLAN) positioning system is disclosed that allows the WLAN system to determine the location attributes of a client device operating in a power save mode, operating on a different channel than the WLAN's access points, and/or operating in an ad-hoc mode. The client device periodically performs scanning operations during which beacon frames broadcast by a selected AP(s) can be received. The client device parses information embedded in the beacon frames, and in response thereto selectively initiates ranging operations to determine its location attributes. After determining its location attributes, the client devices sends the location attributes back to the selected AP(s).

25 Claims, 7 Drawing Sheets

DRIVING HYBRID LOCATION SERVICES FROM WLAN STATIONS USING ACCESS POINTS

TECHNICAL FIELD

The present embodiments relate generally to wireless networks, and specifically to determining the location of Wi-Fi enabled wireless devices.

BACKGROUND OF RELATED ART

Modern navigation systems frequently use a global navigation satellite system (GNSS) for position determination. However, the recent proliferation of Wi-Fi access points in wireless local area networks (WLANs) has made it possible for navigation systems to use these access points for position determination, especially in areas where there is a large concentration of active Wi-Fi access points (e.g., urban cores, shopping centers, office buildings, and so on). Indeed, WLAN positioning systems can be advantageous over GNSS in certain environments because of GNSS signal coverage limitations. For example, while GNSS signals may not be readily detectable inside structures such as shopping malls and office buildings (e.g., due to signal attenuation and/or multipath effects), wireless signals generated by Wi-Fi access points located within such structures are typically detectable by each other and by Wi-Fi enabled mobile devices within range of such access points.

For WLAN positioning systems, the locations of the Wi-Fi access points (APs) are used as reference points from which well-known trilateration techniques can determine the location of a mobile device (e.g., a Wi-Fi-enabled cell phone, laptop, or tablet computer). More specifically, the mobile device can use the received signal strength indicators (RSSI) associated with a number of visible APs as indications of the distances between the mobile device and each of the detected APs, where a stronger RSSI means that the mobile device is closer to the AP and a weaker RSSI means that the mobile device is further from the AP. The mobile device can also use the round trip time (RTT) of signals transmitted to and from the APs to estimate the distances between the mobile device and the APs. Once these distances are estimated, the location of the mobile device relative to the APs can be determined using trilateration techniques.

Whether using RSSI or RTT techniques to determine the distances between the mobile device and the visible Wi-Fi access points, the precise geographic location (e.g., latitude and longitude) of at least three such APs needs to be known to establish the absolute location of the mobile device. Once the location coordinates of 3 visible APs are known to the mobile device, positioning software operating on the mobile device can use the estimated distances between itself and each of the 3 access points (e.g., calculated using ranging operations involving RTT and/or RSSI techniques) to calculate the location coordinates of itself using trilateration techniques.

More recently, increasing numbers of mobile devices (e.g., smart-phones and tablet computers) are capable of implementing various location-based services. This trend has led to the evolution of hybrid location services (HLS) in which APs associated with a WLAN determines the location of a mobile device and then the WLAN coordinates the delivery of information (e.g., maps, location-based advertisements and coupons, and so on) to the mobile device based upon the location of the mobile device. Typically, HLS-enabled WLAN systems are controlled by a central server that can instruct one or more APs associated with the WLAN to determine the location of a mobile device that is within range of the WLAN. To effectively facilitate such location-based services on the mobile device, it is important that the WLAN system can determine the location of the mobile device with a high level of accuracy, which as mentioned above typically involves determining the distances between the mobile device and at least 3 APs having known location coordinates. Unfortunately, the accuracy of current HLS-enabled WLAN systems may be degraded when the mobile device is not responsive to request (REQ) packets or NULL frames sent by one or more of such APs. The non-responsiveness of the mobile device typically results from the mobile device being in a power save mode, the mobile device operating in a different radio band than the APs, and/or the mobile device operating in an Independent Basic Service Set (IBSS) mode (e.g., in an ad-hoc or peer-to-peer 802.11 wireless configuration mode).

More specifically, for conventional HLS-enabled WLAN systems to determine the location of a mobile device using RF ranging operations (e.g., RTT techniques), at least a first AP associated with the WLAN system should have a wireless connection to the mobile device. Thereafter, the first AP can determine the distance between itself and the mobile device using RF ranging operations (e.g., by calculating the RTT of a NULL or REQ frame sent by the first AP to the mobile device and of the acknowledgment (ACK) frame sent from the mobile device back to the first AP). However, if the WLAN's central server instructs a second AP associated with the WLAN system to determine the distance between itself and the mobile device, and the second AP does not have a connection established with the mobile device, then the second AP may spoof the MAC address of the first AP and thereafter send a spoofed NULL frame to the mobile device. Because the NULL frame appears to have been sent by the first AP (with which the mobile device has an established connection), the mobile device responds to the spoofed NULL frame by sending an ACK frame. Then, the second AP can use the difference in time between transmission of the NULL frame and receipt of the ACK frame to calculate the distance between itself and the mobile device.

Unfortunately, there are several problems with the WLAN central server instructing the second AP (or any AP that does not have a wireless connection established with the mobile device) to determine the location of the mobile device. First, if the mobile device is in a power-save mode, then the spoofing technique does not work because the mobile device will not receive the spoofed NULL frame, and therefore will not respond to the second AP's spoofed NULL frame with the ACK frame. Second, if the mobile device is off-channel when the second AP sends the spoofed NULL frame, then the mobile device may not receive the spoofed NULL frame from AP2. Third, if the mobile device is operating in an IBSS (ad-hoc) mode, and is thus not connected to the WLAN, the mobile device will not respond to the NULL frame.

Thus, there is a need for an HLS-enabled WLAN system to determine the location of a mobile device when the mobile device is in a power save mode, when the mobile device is operating in a different radio band than the APs, and/or when the mobile device is operating in an ad-hoc or peer-to-peer mode.

SUMMARY

A WLAN system is disclosed that solves the above-mentioned problems without relying upon spoofing techniques and without relying upon a direct connection between an access point (AP) associated with the WLAN and a mobile device. In accordance with the present embodiments, a central server associated with the WLAN may instruct the APs to embed vendor information elements (IE) within beacon frames that are then broadcast as modified beacon frames by a number of APs associated with the WLAN. The vendor IE may include the MAC addresses, configuration information, location attributes, and other information about the APs, and may also include the MAC address of a mobile device for which location information is desired by the WLAN system. The mobile device parses the vendor IE embedded within the modified beacon frame(s) to identify which AP is seeking to determine the mobile device's location. In response thereto, the mobile device sends a probe request (REQ) frame to the identified AP. Upon receiving the REQ frame from the mobile device, the identified AP sends an acknowledgement (ACK) frame back to the mobile device. After receiving the ACK frame, the mobile device may calculate the RTT of the REQ and ACK frames sent between the mobile device and the identified AP, and thereafter send the RTT information back to the identified AP (e.g., in a subsequent probe signal). For some embodiments, the mobile device may also calculate its location relative to the WLAN APs and embed its location in the subsequent probe signal sent to the AP. In response thereto, the AP may upload the location attributes (e.g., the RTT and/or location information) of the mobile device to the WLAN server, for example, so that the WLAN server can facilitate the delivery of various location-based services to the mobile device.

For some embodiments, mobile devices associated with the WLAN are configured and/or programmed to perform periodic foreground and/or background scanning operations so that (1) the WLAN APs can detect the presence of the mobile devices and (2) the mobile devices are "awake" long enough to receive the modified beacon frames sent by the WLAN APs. In this manner, even if a given mobile device is in a power save mode, operates on a different channel than a particular AP, and/or operates in an ad-hoc mode, the mobile device may receive the modified beacon frames broadcast by the WLAN APs and thereafter complete RF ranging operations (e.g., during the "wake-up" times in which the mobile device is performing scanning operations).

BRIEF DESCRIPTION OF THE DRAWINGS

The present embodiments are illustrated by way of example and are not intended to be limited by the figures of the accompanying drawings, where.

DETAILED DESCRIPTION

In accordance with the present embodiments, accurate position capability can be provided using a Wireless Local Area Network (WLAN). As used herein, the term WLAN can include communications governed by the IEEE 802.11 standards, Bluetooth, HiperLAN (a set of wireless standards, comparable to the IEEE 802.11 standards, used primarily in Europe), and other technologies having relatively short radio propagation range. Further, as used herein, the terms "mobile device" and "client device" refer to a communication device that can communicate wirelessly over an associated WLAN (and other wireless networks such as cellular and Bluetooth networks), and thus the terms are interchangeable.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

In accordance with the present embodiments, a wireless local area network (WLAN) positioning system and method are disclosed that allow the WLAN system to determine the location attributes of a mobile or client device even when the client device is in a power save mode, when the client device is operating in a different channel than the WLAN's APs, and/or when the client device is operating in an ad-hoc mode. In addition, the present embodiments allow the WLAN system to determine the location attributes of the client device without relying upon spoofing techniques and without a direct wireless connection between the client device and the WLAN APs.

More specifically, a central server associated with the WLAN system may instruct one or more of the WLAN's APs to determine the location attributes of a given client device by broadcasting modified beacon frames embedded with vendor IE that include the MAC address(es) of the AP(s), the MAC address of the client device, and other information. Further, in accordance with the present embodiments, the client device is configured and/or programmed to perform periodic foreground and/or background scanning operations so that (1) the WLAN APs can detect the presence of the client device and (2) the client device is "awake" long enough to receive the modified beacon frames sent by the WLAN APs.

Upon receiving the modified beacon frames, the client device parses the embedded IE to identify which AP is seeking to determine its location. In response thereto, the client device sends a probe request (REQ) frame to the identified AP, which in turn sends an acknowledgement (ACK) frame back to the client device. After receiving the ACK frame, the client device may calculate the RTT of the REQ and ACK frames sent between the client device and the identified AP, and thereafter send the RTT information back to the identified AP in a subsequent probe signal. For some embodiments, the client device may also calculate its location relative to the WLAN APs and embed its location in the subsequent probe signal sent to the AP. Thereafter, the AP may upload the location attributes (e.g., the RTT and/or location information) of the client device to the WLAN server, for example, so that the WLAN server can facilitate the delivery of various location-based services to the client device.

Thus, in accordance with the present embodiments, even if the client device is in a power save mode, operates on a different channel than a particular AP, and/or operates in an ad-hoc mode, the client device may receive the modified beacon frames broadcast by the WLAN APs, perform RF ranging operations (e.g., using RTT techniques) on behalf of the AP, and thereafter report its location attributes back to the WLAN system.

Figure 1:
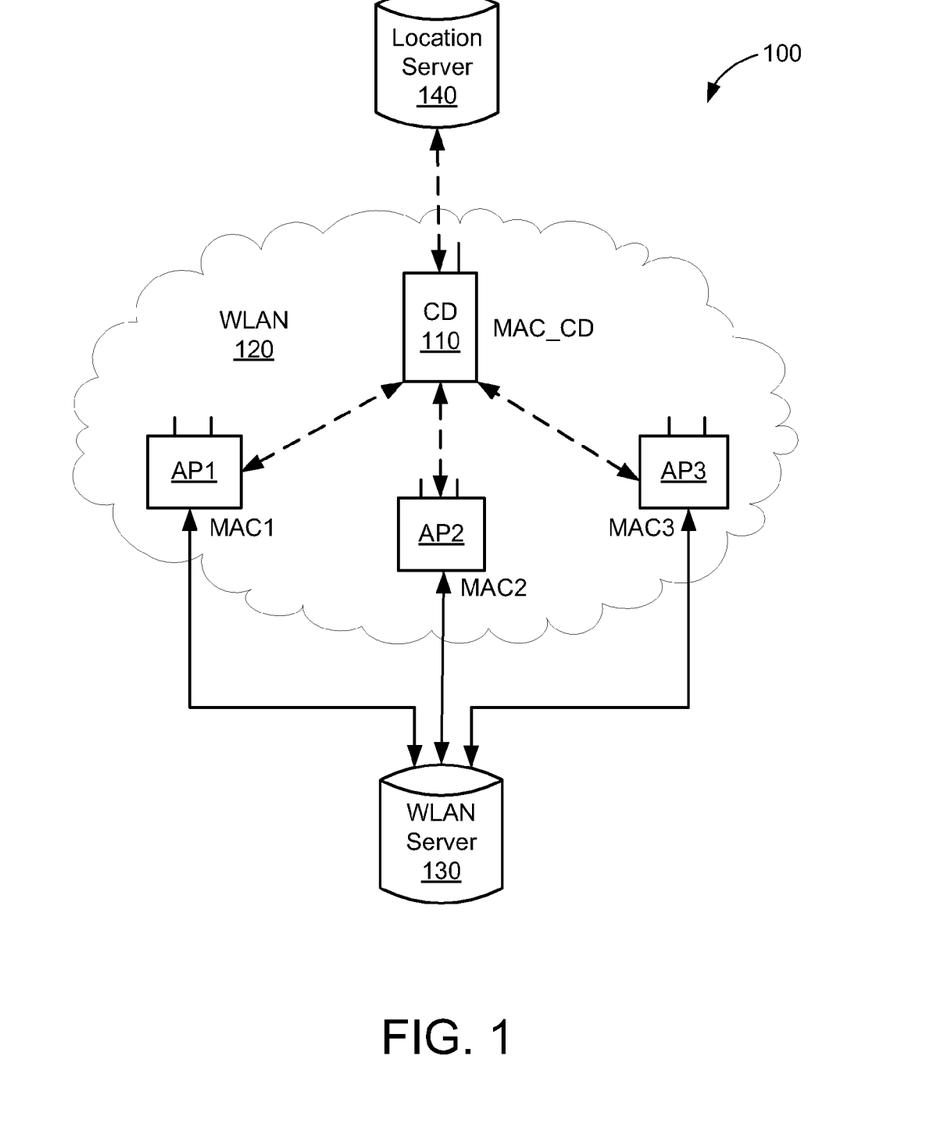
FIG. 1 is a block diagram of a WLAN positioning system within which the present embodiments can be implemented.

FIG. 1 is a block diagram of a wireless positioning system (WLAN system) 100 in accordance with the present embodiments. WLAN system 100 is shown to include a mobile device or client device (CD) 110, a wireless local area network (WLAN) 120, a WLAN central server 130, and an access point location server (APLS) 140. The WLAN 120 is formed by a plurality of Wi-Fi access points (APs) that may operate according to the IEEE 802.11 family of standards (or according to other suitable wireless protocols). Although only three access points AP1-AP3 are shown in FIG. 1 for simplicity, it is to be understood that WLAN 120 can be formed by any number of access points. Each of access points AP1-AP3 is assigned a unique MAC address (i.e., MAC1-MAG3, respectively) that is programmed therein by, for example, the manufacturer of the access point. Similarly, the client device 110 is also assigned a unique MAC address (MAC_CD). Each MAC address, which may be commonly referred to as the "burned-in address," the organizationally unique identifier (OUI), or the BSSID, in one embodiment includes six bytes (and thus 12 nibbles) of data. The first 3 bytes of the MAC address may identify which organization manufactured the device, and may be assigned to such organizations by the Institute of Electrical and Electronic Engineers (IEEE). The second 3 bytes of the MAC address, which may be referred to as the network interface controller (NIC) specific bytes, may be used to uniquely identify the individual device.

The WLAN central server 130, which is connected to access points AP1-AP3 over wired and/or wireless connections, controls the operation of the APs, and may allow one or more of the APs to determine the location attributes of client device 110 (e.g., to facilitate location-based services thereon) without having a direct connection with the client device and without using spoofing techniques. More specifically, in accordance with the present embodiments, the WLAN central server 130 can determine the location attributes of the client device 110 using management frames exchanged between the client device and one or more of the APs, even if the client device is in a power save mode, operates on a different channel than a particular AP, and/or operates in an ad-hoc manner, as described in more detail below.

The APLS 140, which may be accessible by client device 110 and/or the WLAN central server 130, includes a database that stores the MAC addresses and location coordinates of a plurality of deployed access points (e.g., not just access points AP1-AP3 of FIG. 1). The database associated with the APLS 140 may be provided by companies such as Google, Skyhook, Devicescape, and/or WiGLE. The APLS 140 may also store other information associated with the access points including, for example, the accuracy of the location coordinates of each access point, the last location update for each access point, the last time each access point was visible, the protocol version of each access point, and so on. For some embodiments, selected portions of the APLS 140 can be retrieved and stored within the client device 110. For other embodiments, the APLS 140 may be omitted.

Client device 110 can be any suitable Wi-Fi enabled wireless device including, for example, a cell phone, PDA, tablet computer, laptop computer, or the like. For the embodiments described herein, client device 110 includes radio frequency (RF) ranging circuitry (e.g., formed using well-known software modules, hardware components, and/or a suitable combination thereof) that can be used to estimate the distance between itself and one or more visible access points (AP) using suitable ranging techniques. For example, client device 110 can use received signal strength indicator (RSSI) and/or round trip time (RTT) techniques to estimate the distance between itself and the access points AP1-AP3, for example, by correlating each RSSI or RTT value with a distance. In addition, client device 110 may include a local memory that stores a cache of Wi-Fi access point location data, and includes a processor that can execute WLAN positioning software, APLS data retrieval software, and/or periodic scanning software. The positioning software can calculate the position of client device 110 using the known locations of visible access points as reference points. The data retrieval software can selectively request location data for access points from the APLS 140 using public and/or private fetching operations. The periodic scanning software can cause client device 110 to wake-up from a power save mode to perform scanning operations, during which times the client device may receive modified beacon frames sent by one or more of AP1-AP3 and perform RF ranging operations to determine the location attributes of client device 110 on behalf of the WLAN server 130 and/or its associated APs.

Figure 2A:
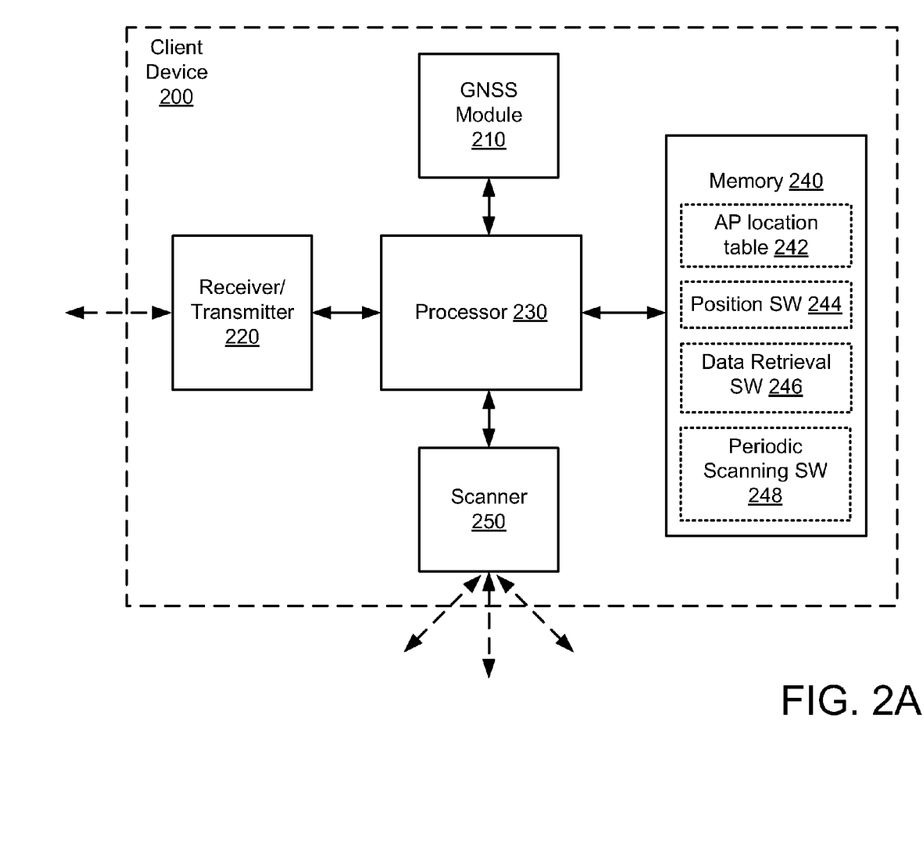
FIG. 2A is a block diagram of a mobile client device in accordance with some embodiments.

FIG. 2A shows a client device 200 that is one embodiment of client device 110 of FIG. 1. Client device 200 includes a global navigation satellite system (GNSS) module 210, transmitter/receiver circuit 220, processor 230, memory 240, and scanner 250. The transmitter/receiver circuit 220 can be used to transmit signals to and receive signals from access points AP1-AP3 and/or APLS 140 (see also FIG. 1). Scanner 250, which is well-known, can be used to scan the surrounding environment to detect and identify nearby access points (e.g., access points within range of client device 200). For some embodiments, the scanner 250 can search for nearby access points by periodically transmitting MAC address request frames. An access point within range of client device 200 receives one or more of the requests and responds by transmitting its MAC address to the client device 200. If client device 200 has line-of-sight with a suitable number (e.g., 3 or more) navigation satellites, the GNSS module 210 can determine the current location of client device 200 using triangulation techniques, and can then provide the location information to processor 230 for storage in memory 240.

Memory 240 includes an access point location table 242 that can be used as a local cache to store the MAC addresses of a plurality of access points, the location coordinates of such access points, and other suitable location or configuration information of the access points. For some embodiments, each entry of the access point location table 242 includes an access point field to store the name of the associated access point, a BSSID field to store the MAC address of the access point, a coordinate field to store the location coordinates of the access point, and an uncertainty field to store a location uncertainty value for the access point.

Figure 4:
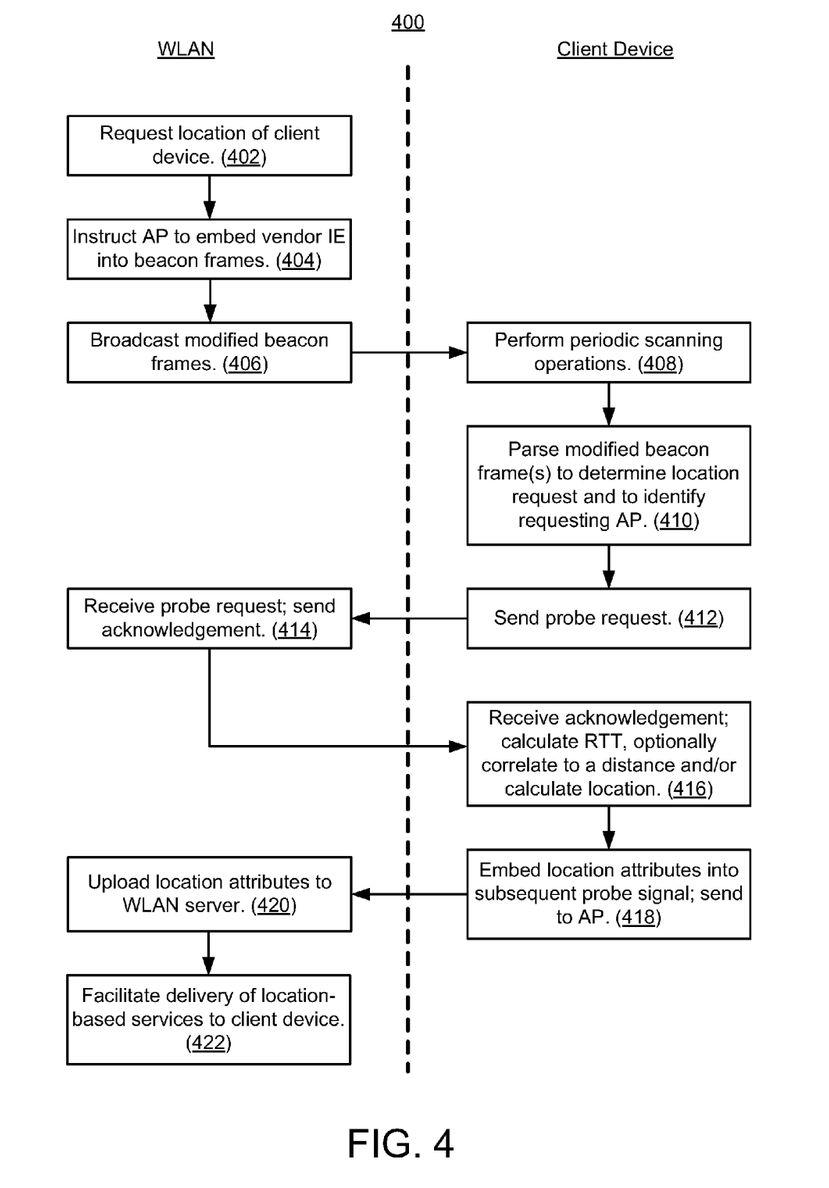
FIG. 4 is an illustrative flow chart depicting an exemplary operation for determining the location attributes of a client device in accordance with the present embodiments.

Memory 240 also includes a non-transitory computer-readable medium (e.g., one or more nonvolatile memory elements, such as EPROM, EEPROM, Flash memory, a hard drive, and so on) that stores the following software modules:

- a positioning software module 244 to determine the location of the client device based on locations of access points using trilateration techniques and/or to determine the RTT and/or RSSI of signals transmitted between the client device and selected access points (e.g., as described for operation 416, FIG. 4);
- a data retrieval software module 246 to query the APLS 140 for access point information (e.g., as described for operation 416, FIG. 4); and
- a periodic scanning software module 248 to perform periodic scanning operations and/or to wake up from power save mode to receive beacon frames broadcast by the WLAN AP(s) and perform RF ranging operations (e.g., as described for operation 408, FIG. 4).

Each software module includes instructions that, when executed by processor 230, cause the client device 200 to perform the corresponding functions. The non-transitory computer-readable medium of memory 240 thus includes instructions for performing all or a portion of the client-side operations of method 400 (FIG. 4).

Processor 230, which is coupled to transmitter/receiver circuit 220, GNSS module 210, memory 240, and scanner 250, can be any suitable processor capable of executing scripts or instructions of one or more software programs stored in client device 200 (e.g., within memory 240). For example, processor 230 can execute WLAN positioning software module 244 and data retrieval software module 246. The positioning software module 244 can be executed by processor 230 to determine the location of client device 200 using nearby access points as reference points. For example, to determine the position of client device 200, the precise locations of three selected access points (e.g., access points AP1-AP3) are first determined, either by accessing their location coordinates from location table 242, by retrieving their location coordinates from the APLS 140, or by parsing AP location information embedded within signals transmitted by the APs, as explained in more detail below. Next, positioning software module 244 as executed by processor 230 estimates the distance between client device 200 and each of the selected access points using suitable RF ranging techniques (e.g., RSSI and/or RTT techniques), and may also use the location coordinates of the selected access points and the estimated distances between them and client device 200 to calculate the position of client device 200 using trilateration techniques.

Once the MAC addresses of the visible access points are obtained, the data retrieval software module 246 first checks the access point location table 242 within memory 240 to determine whether location table 242 stores the location information of the specified access points. If so, then the location information is provided to the positioning software module 244 to calculate the position of client device 200. If not, then the data retrieval software module 246 transmits the MAC addresses of the specified access points to the APLS 140. In response thereto, the APLS 140 uses the provided MAC addresses as look-up values to access the location information of the requested access points, and then transmits the requested location information to client device 200. Thereafter, client device 200 can use the retrieved location information to calculate the position of client device 200.

The periodic scanning software module 248 can be executed by processor 230 to cause client device 110 to wake-up from a power save mode to perform scanning operations, during which times the client device 200 may receive modified beacon frames sent by one or more of AP1-AP3 and perform RF ranging operations to determine the location attributes of client device 200 on behalf of the WLAN server 130 and/or its associated APs.

Figure 2B:
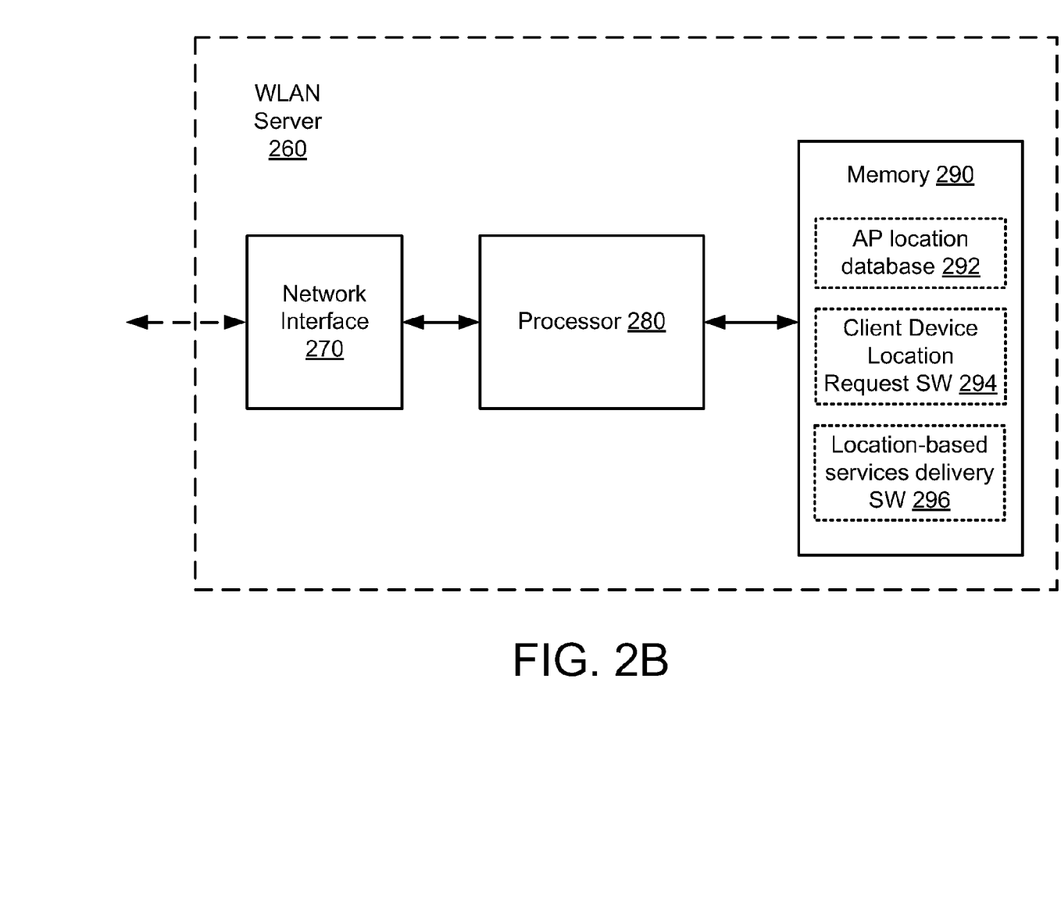
FIG. 2B is a block diagram of a WLAN central server in accordance with some embodiments.

FIG. 2B shows a WLAN central server 260 that is one embodiment of WLAN central server 130 of FIG. 1. WLAN central server 260 includes a network interface 270, a processor 280, and a memory 290. The network interface 270 can be used to communicate with access points associated with WLAN 120 (e.g., access points AP1-AP3) either directly or via one or more intervening networks and to transmit signals. Processor 280, which is coupled to network interface 270 and memory 290, can be any suitable processor capable of executing scripts or instructions of one or more software programs stored in the central server 260 (e.g., within memory 290).

Memory 290 includes an access point location database 292 that stores the MAC addresses (e.g., BSSIDs) of a plurality of access points, the location coordinates of such access points, and other suitable location or configuration information of the access points. Memory 290 also includes a non-transitory computer-readable medium (e.g., one or more nonvolatile memory elements, such as EPROM, EEPROM, Flash memory, a hard drive, and so on) that stores the following software modules:

- a client device location request software module 294 to instruct a selected AP(s) associated with WLAN 120 to ascertain the location attributes of a given client device, and to instruct the selected AP(s) to embed vendor IE containing AP MAC address and client device MAC address information into beacon frames for broadcast (e.g., as described for operations 402 and 404, FIG. 4); and
- a location-based services delivery software module 296 to facilitate the delivery of various location-based services to client devices associated with the WLAN 120 (e.g., as described for operation 422, FIG. 4).

Each software module includes instructions that, when executed by processor 280, cause the WLAN central server 260 to perform the corresponding functions. The non-transitory computer-readable medium of memory 290 thus includes instructions for performing all or a portion of the server-side operations of method 400 (FIG. 4).

As discussed above, the WLAN system 100 may determine the location attributes of client device 110 without relying upon spoofing techniques and without relying upon a direct connection between access points (APs) associated with the WLAN 120 and the client device 110. In accordance with the present embodiments, the WLAN central server 130 embeds vendor information elements (IE) within beacon frames that are broadcast by a number of APs associated with the WLAN 120. The vendor IE may include the MAC addresses, configuration information, location information, and other information about the APs. For some embodiments, the IE embedded into the beacon frames broadcast by the WLAN APs also include the MAC address of a given client device 110 for which location information is desired by the WLAN system 100.

Further, for some embodiments, client devices 110 associated with the WLAN system 100 perform periodic scanning operations so that (1) APs associated with WLAN system 100 are able to detect the presence of such client devices (e.g., and thereby ascertain their MAC addresses so that the MAC address of a given client device may be embedded into beacon frames broadcast by the WLAN APs), and (2) the client devices 110 are able to receive and respond to beacon frames and/or acknowledgement frames sent by the AP(s) associated with the WLAN. More specifically, if a given client device 110 is not in a connected state (e.g., if the client device does not have an established connection to at least one AP associated with the WLAN 120), then the given client device 110 performs "foreground" scanning operations in which it scans all channels associated with the communication protocol(s) employed by the WLAN 120 (e.g., all channels associated with the Wi-Fi protocol, as embodied by the IEEE 802.11 family of standards). If the client device 110 is in a connected state (e.g., if the client device has an established connection to at least one AP associated with the WLAN 120), then the client device 110 may perform "background" scanning operations. More specifically, while in the connected state, the client device 110 scans off channels using NULL frames that, in accordance with the IEEE 802.11 standards, include a power mode (PM) bit indicating whether the client device 110 is in a power save mode. For example, a value of PM=1 indicates that the client device 110 is in the power save mode, while other values of the PM bit (e.g., PM=0) indicate that the client device 110 is not in the power save mode.

Note that during these scanning operations, the client device 110 broadcasts probe requests that may include (1) the MAC address of the client device and/or (2) the MAC address of each of a number of APs associated with the WLAN 120. In this manner, the WLAN 120 may not need to know whether the client device 110 is in the power save mode because the client device "wakes-up" to initiate signal exchanges with the WLAN APs, and therefore is able to receive the modified beacon frames and/or any subsequent responses (e.g., ACK frames) from the WLAN APs.

After receiving the beacon frames from the AP(s), the client device 110 parses the embedded vendor IE to determine which AP is seeking to ascertain the location attributes of the client device 110. Thus, if the client device 110 is able to parse the vendor IE embedded within the beacon frames, then the client device 110 may identify which AP is seeking to determine the client device's location attributes. In response thereto, the client device 110 sends a probe request (REQ) frame to the identified AP (e.g., as unicast frame). Upon receiving the REQ from the client device, the identified AP may send an acknowledgement (ACK) frame back to the client device 110. After receiving the ACK frame from the identified AP, the client device 110 may calculate the RTT (and/or the RSSI) of the REQ and ACK frames sent between the client device 110 and the identified AP, and thereafter send the RTT information back to the identified AP (e.g., in a subsequent probe signal). Thereafter, the identified AP and/or the WLAN central server 130 may calculate the location of the client device 110 using trilateration techniques.

More specifically, for some embodiments, the client device 110 may embed the RTT information and its MAC address into a subsequent probe signal sent to the identified AP. If this subsequent probe signal contains vender IE and an associated parameter list, then the identified AP parses this information and updates its database of RTT information and other location attributes associated with the client device 110. If not, the AP may ignore the subsequent probe signal.

Figure 3A:
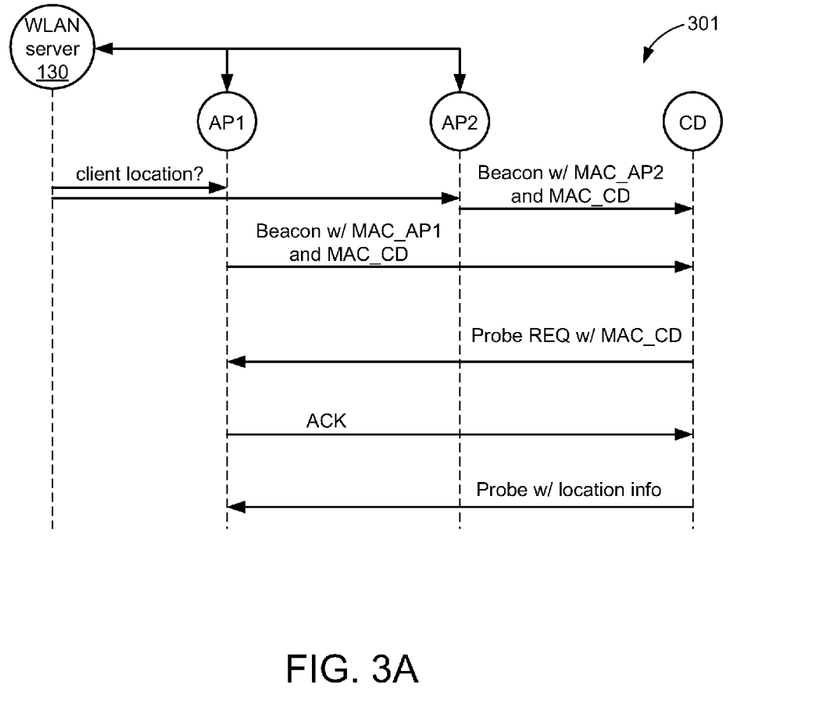
FIG. 3A depicts an exemplary operation in which the WLAN server instructs an access point (AP) to determine the location attributes of a client device in accordance with some embodiments.

An exemplary operation of a WLAN system having first and second access points AP1-AP2 to determine the location attributes of a client device (CD) that is in a power save mode and that does not have a connection established with either AP1 or AP2 is described below with respect to the sequence diagram 301 of FIG. 3A, where time is depicted in the vertical direction and space is depicted in the horizontal direction. As shown in FIG. 3A, the WLAN server 130 is connected to access points AP1 and AP2, which together form a WLAN, and the client device CD does not have a wireless connection with either AP1 or AP2. Thus, WLAN server 130 does not know that the client device CD is in the power save mode, and therefore cannot determine whether the client device CD is able to receive location requests from AP1 or AP2.

In operation, the WLAN server 130 informs AP1 and AP2 that the location attributes of client device CD are desired, and instructs AP1 and AP2 to broadcast modified beacon frames embedded with vender IE that include, for example, AP information and the MAC address of the client device CD. In response thereto, AP1 broadcasts a modified beacon frame that is embedded with vendor IE containing the MAC address of AP1 (MAC_AP1) and the MAC address of the client device (MAC_CD). Similarly, AP2 broadcasts a modified beacon frame embedded with vendor IE containing the MAC address of AP2 (MAC_AP2) and MAC_CD. The beacon frames can be broadcast by AP1 and AP2 either concurrently or sequentially (in any order).

In accordance with the present embodiments, the client device CD is configured and/or programmed to periodically wake up from the power save mode to perform periodic scanning operations (e.g., which may be referred to in the example of FIG. 3A as foreground scanning operations because the client device is not connected to AP1 or AP2). During these wake-up times, the client device may receive the modified beacon frames broadcast by AP1 and/or AP2, parse the vendor IE embedded within the modified beacon frames, and then determine whether its own MAC address is contained therein. If the MAC address of the client device CD is embedded within the received modified beacon frame(s), as depicted in FIG. 3A, then the client device CD is alerted that one or more APs associated with WLAN server 130 are seeking its location attributes. Thus, in response thereto, the client device CD sends a probe request (REQ) frame to AP1 (and/or to AP2) that initiates ranging operations to determine the location attributes of the client device (e.g., the distance between the client device and AP1). The probe REQ frame may be transmitted as a unicast frame, for example, as depicted in FIG. 3A. For some embodiments, the probe REQ frame may be embedded with the MAC address of the client device (MAC_CD). Further, for some embodiments, the client device CD may embed a PM=1 bit in the probe REQ frame to indicate that it is in the power save mode, and is thus only temporarily awake to perform the aforementioned periodic scanning operations.

In response to the probe REQ frame sent by the client device CD1, AP1 (or alternatively AP2) sends an acknowledgement (ACK) frame to the client device CD. Because the client device CD is awake from the power save mode, the client device CD is able to receive the ACK frame. Next, the client device CD may use the difference in time between its transmission of the probe REQ frame and its receipt of the ACK frame to calculate the RTT of the signal exchanges, and may also correlate the RTT into a distance between AP1 and the client device CD. Then, the client device CD embeds the RTT and/or the correlated distance measurement as location attributes into a subsequent probe signal that is sent to AP1. For some embodiments, the client device CD may also determine its own location using trilateration techniques, and embed the resulting location information into the subsequent probe signal.

Figure 3B:
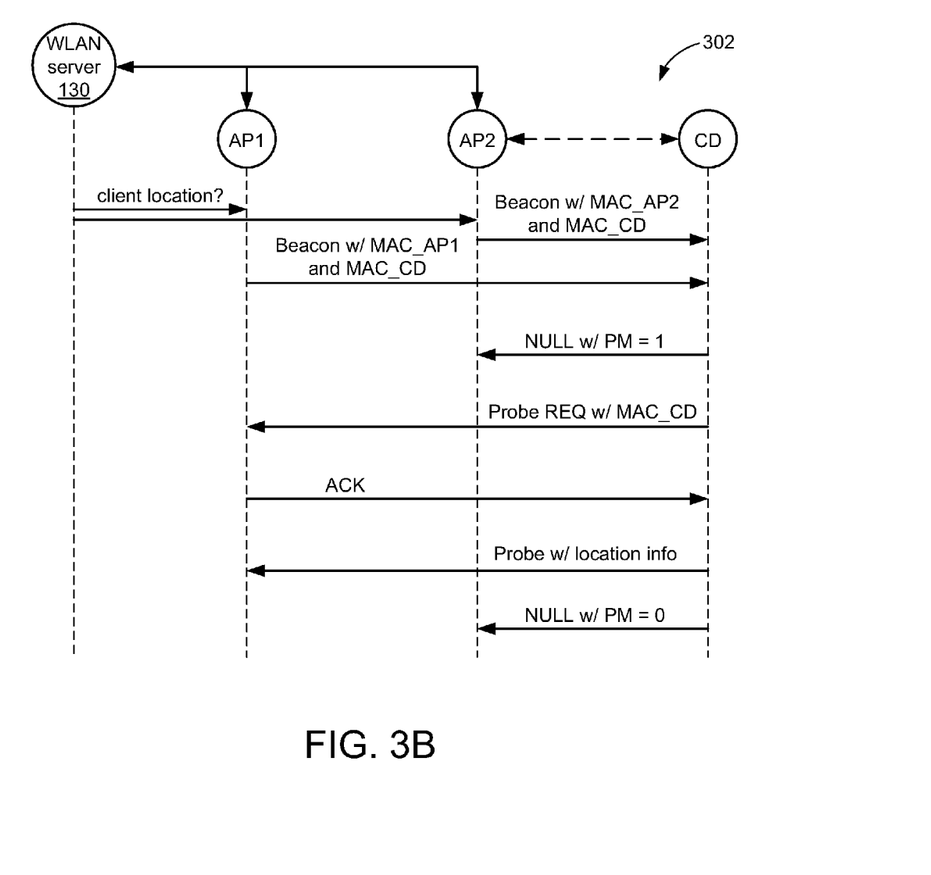
FIG. 3B depicts an exemplary operation in which the WLAN server instructs an AP to determine the location attributes of a client device in accordance with other embodiments.

As mentioned above, if the client device is connected with one of the access points associated with the WLAN server 130 but is in a power save mode, then the client device may be configured and/or programmed to perform background off-channel scanning operations. For example, an exemplary operation of a WLAN system having first and second access points AP1-AP2 to determine the location attributes of a client device (CD) that is in a power save mode and that has a connection established with access point AP2 but not with access point AP1 is described below with respect to the sequence diagram 302 of FIG. 3B, where time is depicted in the vertical direction and space is depicted in the horizontal direction. As shown in FIG. 3B, the WLAN server 130 is connected to access points AP1 and AP2, which together form a WLAN, and the client device CD has a wireless connection with AP2 but not with AP1.

In operation, the WLAN server 130 informs AP1 and AP2 that the location attributes of client device CD are desired, and instructs AP1 and AP2 to broadcast beacon frames embedded with vender IE that include, for example, AP information and the MAC address of the client device CD. In response thereto, AP1 broadcasts a modified beacon that is embedded with vendor IE containing the MAC address of AP1 (MAC_AP1) and the MAC address of the client device (MAC_CD). Similarly, AP2 broadcasts a modified beacon embedded with vendor IE containing the MAC address of AP2 (MAC_AP2) and MAC_CD. The beacon signals can be broadcast by AP1 and AP2 either concurrently or sequentially (in any order).

In accordance with the present embodiments, the client device CD is configured and/or programmed to periodically wake up from the power save mode to perform off-channel background scanning operations, during which the client device also broadcasts NULL frames having the PM bit=1. The connected access point AP2 receives the NULL frame and, in response to the embedded PM=1 information, determines that the client device CD is in a power save mode and buffers data for the WLAN server 130 on behalf of the client device CD.

Because the client device CD is "awake" during its off-channel scanning operations, the client device CD receives the modified beacon frames from AP1 (e.g., even if AP1 operates on a different channel than AP2). The client device CD parses the vendor IE embedded within the modified beacon frames, and then determines whether its own MAC address is contained therein. If the MAC address of the client device CD is embedded within the received modified beacon frame(s), as depicted in FIG. 3B, then the client device CD is alerted that AP1 is seeking its location attributes.

In response thereto, the client device CD sends to AP1 a unicast probe request (REQ) frame that contains the client device's MAC address (MAC_CD). Then, in response to the probe request sent by the client device CD, AP1 sends an acknowledgement (ACK) frame to the client device CD. The client device CD receives the ACK frame, and can use the difference in time between its transmission of the probe REQ frame and its receipt of the ACK frame to calculate the RTT of the signal exchanges, and may also correlate the RTT into a distance between AP1 and the client device CD. Then, the client device CD embeds the RTT and/or the distance measurement into a subsequent probe signal that is sent to AP1. For some embodiments, the client device CD may also determine its own location using trilateration techniques, and embed the resulting location information into the subsequent probe signal.

For this example, if AP1 and AP2 are operating on different channels, and thus the client device CD communicates with AP1 during off-channel scanning operations, then after the client device CD returns to its "home" channel (e.g., the channel through which it is connected to AP2), it sends a NULL frame having PM=0 to AP2 to indicate that the client device is no longer in the power save mode. In response to the NULL frame having PM=0, AP2 refreshes all buffered location attribute data received from the client device and uploads such data to the WLAN server 130. Conversely, if AP1 is on the same channel as AP2, then the client device CD may not need to perform off channel scanning operations, and thus may not transmit the NULL frame having PM=0 to AP2.

Figure 3C:
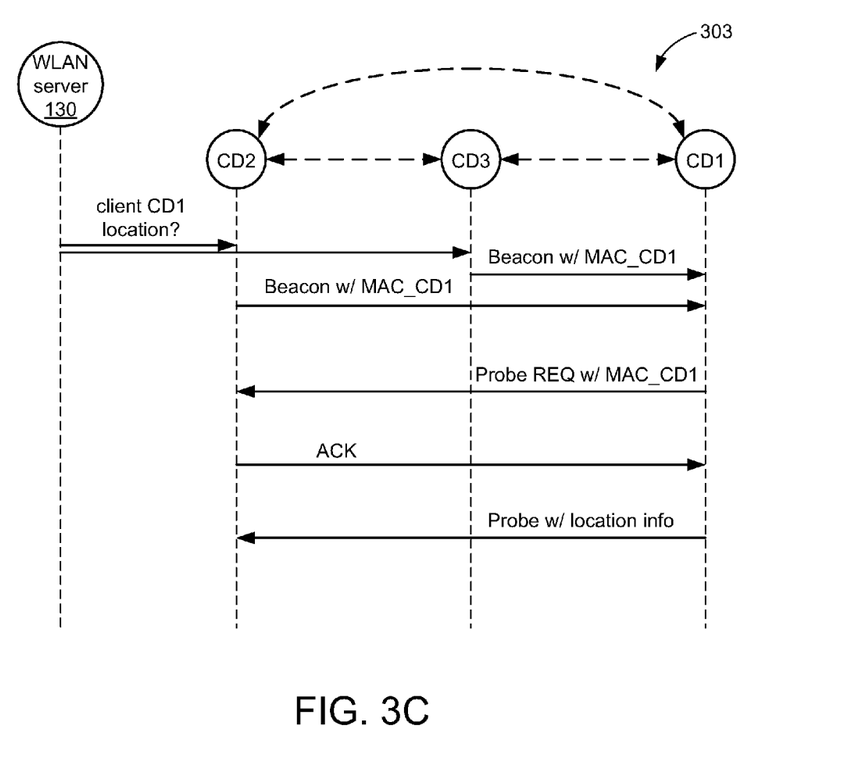
FIG. 3C depicts an exemplary operation in which the WLAN server instructs an AP to determine the location attributes of a client device in accordance with yet other embodiments.

An exemplary operation of a WLAN system for determining the location attributes of a first client device (CD1) that is operating in an ad-hoc (e.g., peer-to-peer) manner with other client devices CD2 and CD3 is described below with respect to the sequence diagram 303 of FIG. 3C, where time is depicted in the vertical direction and space is depicted in the horizontal direction. As shown in FIG. 3C, the WLAN server 130 is not connected to client devices CD1-CD3, which together operate in an ad-hoc network. To determine the location attributes of client device CD1, the WLAN server 130 broadcasts a beacon signal that alerts all nearby client devices that it seeks the location attributes of client device CD1 and that instructs all such client devices to embed vendor IE into beacon frames broadcast by such client devices. In response thereto, client devices CD2 and C3 embed the vendor IE (e.g., including the MAC address of the first client device CD1) into their beacon frames, and the resulting modified beacon frames are broadcast by client devices CD2 and CD3.

In accordance with the present embodiments, the first client device CD1 performs periodic scanning operations, during which the first client device is able to receive the modified beacon frames broadcast by the other client devices CD2-CD3. The first client device CD1 parses the modified beacon signal and extracts its own MAC address (e.g., MAC_CD1) from the modified beacon frame. In response thereto, the first client device CD1 transmits a probe request (REQ) frame embedded with its MAC address to second client device CD2. In response thereto, the second client device CD2 sends an acknowledgement (ACK) frame back to the first client device CD1. Next, the first client device CD1 can use the difference in time between its transmission of the probe REQ frame and its receipt of the ACK frame to calculate the RTT of the signal exchanges, and thereafter correlate the RTT into a distance between itself and the second client device CD2. Then, the first client device CD1 embeds the RTT and/or the distance measurement into a subsequent probe signal that is sent to the second client device CD2. Thereafter, the second client device CD2 may provide the RTT and/or the distance measurement (received from CD1) to the WLAN server 130 using the ad-hoc nodes. Alternatively, the second client device CD2 may transmit the RTT and/or the distance measurement (received from CD1) to the WLAN server 130 via one or more APs (not shown in FIG. 3C for simplicity) associated with the WLAN server 130 (e.g., by sending probe or other suitable signals or frames having embedded RTT and/or distance measurements to the APs, which in turn may upload the information to the WLAN server 130). For some embodiments, the first client device CD1 may also determine its own location using trilateration techniques, and embed the resulting location information into the subsequent probe signal.

FIG. 4 is a flowchart illustrating a method 400 of WLAN system 100 determining the location attributes of a client device in accordance with some embodiments. In the method 400, the WLAN server 130 requests a selected AP(s) to determine the location attributes of client device 110 (402). The WLAN server 130 instructs the selected AP to embed vendor IE into beacon frames (404). In response thereto, the selected AP creates a modified beacon frame having embedded vendor IE, and broadcasts the modified beacon frames (406).

The client device 110 performs periodic scanning operations (408). Thus, if the client device 110 is in a power save mode, the client device 110 wakes up to perform the scanning operations and is therefore able to receive the modified beacon frames broadcast by the selected AP(s). The client device then parses the vendor IE embedded in the modified beacon frames to (1) determine whether its location attributes are sought and (2) identify which AP is requesting its location attributes (410). Next, the client device 110 sends a probe request (REQ) frame to the selected AP (412).

The selected AP receives the probe REQ frame, and sends an acknowledgement (ACK) frame back to the client device (414). In response thereto, the client device 110 calculates the RTT of the REQ and ACK frames (416). For some embodiments, the client device 110 may also correlate the RTT to a distance between itself and the selected AP and/or may determine its location relative to the WLAN APs. Then, the client device 110 embeds the location attributes into a subsequent probe signal, and sends the subsequent probe signal to the selected AP (418). The selected AP may then upload the location attributes of the client device 110 to the WLAN server 130 (420). Thereafter, the WLAN server 130 may facilitate the delivery of various location-based services to client device 110 (e.g., in response to the determined location attributes of the client device) (422).

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. For example, method steps depicted in the flow charts of FIGS. 5 and 6 can be performed in other suitable orders and/or one or more methods steps may be omitted.

What is claimed is:

1. In a wireless network having a plurality of access points (APs) associated with a server, a method of obtaining location attributes of a wireless client device, the method comprising:
    performing periodic scanning operations in the client device during which the client device receives a beacon frame broadcast from a selected AP, wherein the beacon frame includes information elements that identify the selected AP and that indicate a location request of the client device;
    parsing the information elements in the client device to identify the selected AP and to determine the location request of the client device; and
    sending a probe request from the client device to the selected AP upon determining the location request, wherein the probe request is to initiate ranging operations with the selected AP to determine the location attributes of the client device.

2. The method of claim 1, further comprising:
    receiving an acknowledgement frame from the selected AP in the client device in response to the probe request; and
    calculating, in the client device, a round trip time (RTT) associated with transmission of the probe request and the acknowledgement frame.

3. The method of claim 2, further comprising:
    sending the RTT as the location attributes of the client device to the selected AP in a subsequent probe signal.

4. The method of claim 3, further comprising:
    uploading the location attributes of the client device from the selected AP to the server.

5. The method of claim 1, wherein the location request comprises a media access control (MAC) address of the client device.

6. The method of claim 1, wherein the client device wakes up from a power save mode to perform the periodic scanning operations.

7. The method of claim 1, wherein the probe request includes a power mode bit indicating whether the client device is in a power save mode.

8. The method of claim 1, wherein the periodic scanning operations comprise off-channel scanning operations.

9. The method of claim 8, further comprising:
    sending a NULL frame from the client device to the selected AP, wherein the NULL frame comprises an asserted power mode bit indicating that the client device is in a power save mode.

10. A wireless network having a plurality of access points (APs) associated with a server to obtain location attributes of a wireless client device, the network comprising:
    means for performing periodic scanning operations in the client device during which the client device receives a beacon frame broadcast from a selected AP, wherein the beacon frame includes information elements that identify the selected AP and that indicate a location request of the client device;
    means for parsing the information elements in the client device to identify the selected AP and to determine the location request of the client device; and
    means for sending a probe request from the client device to the selected AP upon determining the location request, wherein the probe request is to initiate ranging operations with the selected AP to determine the location attributes of the client device.

11. The network of claim 10, further comprising:
    means for receiving an acknowledgement frame from the selected AP in the client device in response to the probe request; and
    means for calculating, in the client device, a round trip time (RTT) associated with transmission of the probe request and the acknowledgement frame.

12. The network of claim 11, further comprising:
    means for sending the RTT as the location attributes of the client device to the selected AP in a subsequent probe signal.

13. The network of claim 12, further comprising:
    means for uploading the location attributes of the client device from the selected AP to the server.

14. The network of claim 10, wherein the location request comprises a media access control (MAC) address of the client device.

15. The network of claim 10, wherein the client device wakes up from a power save mode to perform the periodic scanning operations.

16. The network of claim 10, wherein the probe request includes a power mode bit indicating whether the client device is in a power save mode.

17. The network of claim 10, wherein the periodic scanning operations comprise off-channel scanning operations.

18. The network of claim 17, further comprising:
sending a NULL frame from the client device to the selected AP, wherein the NULL frame comprises an asserted power mode bit indicating that the client device is in a power save mode.

19. A wireless network having a plurality of access points associated with a server to obtain location attributes of a wireless client device, the client device comprising:
a processor; and
a memory coupled to the processor and having stored therein computer-executable instructions that when executed by the processor cause the client device to:
perform periodic scanning operations during which the client device receives a beacon frame broadcast from a selected access point (AP), wherein the beacon frame is embedded with information elements identifying the selected AP and requesting the location attributes of the client device;
parse the embedded information elements to identify the selected AP and the location request; and
send a probe request to the selected AP, wherein the probe request is to initiate ranging operations with the selected AP to determine the location attributes of the client device.

20. The network of claim 19, wherein the client device is to wake up from a power save mode to perform the periodic scanning operations.

21. The network of claim 19, wherein the instructions, when executed by the processor, further cause the client device to:
receive an acknowledgement frame sent from the selected AP in response to the probe request; and
calculate a round trip time (RTT) associated with transmission of the probe request and the acknowledgement frame.

22. The network of claim 21, wherein the instructions, when executed by the processor, further cause the client device to:
send the RTT as the location attributes of the client device to the selected AP in a subsequent probe signal.

23. The network of claim 19, wherein the server is to instruct the selected AP to embed the information elements into the beacon frame.

24. The network of claim 19, wherein the probe request includes a power mode bit indicating whether the client device is in a power save mode.

25. The network of claim 19, wherein the periodic scanning operations comprise off-channel scanning operations.

* * * * *